(12) United States Patent
Etter (10) Patent No.: US 8,587,631 B2
(45) Date of Patent: Nov. 19, 2013

(54) FACILITATING COMMUNICATIONS USING A PORTABLE COMMUNICATION DEVICE AND DIRECTED SOUND OUTPUT

(75) Inventor: Walter Etter, Wayside, NJ (US)

(73) Assignee: Alcatel Lucent, Paris (FR)

( * ) Notice: Subject to any disclaimer, the term of this patent is extended or adjusted under 35 U.S.C. 154(b) by 657 days.

(21) Appl. No.: 12/825,503

(22) Filed: Jun. 29, 2010

(65) Prior Publication Data

US 2011/0316967 A1   Dec. 29, 2011

(51) Int. Cl.
  *G06F 17/00* (2006.01)
  *H04M 3/00* (2006.01)
  *H04N 5/76* (2006.01)

(52) U.S. Cl.
  USPC .... 348/14.02; 340/10.3; 343/702; 348/14.16; 361/679.55; 367/124; 379/202.01; 381/92; 381/186; 381/335; 382/117; 386/230; 455/404.2; 455/418; 455/517; 700/94; 702/11; 702/108

(58) Field of Classification Search
  USPC .............. 348/14.02, 14.16, 10.3; 361/679.55; 367/124; 379/202.01; 386/230; 455/404.2, 418, 517; 700/94; 343/702; 381/92, 186, 335; 382/117; 702/11, 702/108; 340/10.3
  See application file for complete search history.

(56) References Cited

U.S. PATENT DOCUMENTS

| | | | | |
|---|---|---|---|---|
| 4,745,550 | A * | 5/1988 | Witkin et al. ................... | 702/11 |
| 5,148,493 | A * | 9/1992 | Bruney .......................... | 381/186 |
| 6,642,893 | B1 * | 11/2003 | Hebron et al. ................. | 343/702 |
| 6,801,782 | B2 * | 10/2004 | McCrady et al. .............. | 455/517 |
| 7,027,603 | B2 * | 4/2006 | Taenzer ........................... | 381/92 |
| 7,480,389 | B2 * | 1/2009 | Ricks et al. .................... | 381/335 |
| 7,697,675 | B2 * | 4/2010 | Swerup ..................... | 379/202.01 |
| 8,170,293 | B2 * | 5/2012 | Tosa et al. ..................... | 382/117 |
| 8,416,062 | B2 * | 4/2013 | Austin ......................... | 340/10.3 |
| 2002/0136414 | A1 | 9/2002 | Jordan et al. | |
| 2003/0069710 | A1 * | 4/2003 | Geddes ......................... | 702/108 |
| 2009/0316529 | A1 * | 12/2009 | Huuskonen et al. .......... | 367/124 |
| 2010/0085702 | A1 * | 4/2010 | Liu .......................... | 361/679.55 |
| 2010/0150355 | A1 | 6/2010 | Kon et al. | |
| 2010/0278510 | A1 * | 11/2010 | Goossen ....................... | 386/230 |
| 2011/0039514 | A1 * | 2/2011 | Patnaik et al. ............. | 455/404.2 |
| 2011/0153044 | A1 * | 6/2011 | Lindahl et al. ................. | 700/94 |
| 2011/0316967 | A1 * | 12/2011 | Etter ......................... | 348/14.16 |

FOREIGN PATENT DOCUMENTS

JP     2006165845     6/2006

OTHER PUBLICATIONS

International Search Report and Written Opinion of the International Searching Authority for International application No. PCT/US2011/040411 mailed Sep. 23, 2011.

* cited by examiner

*Primary Examiner* — Gerald Gauthier
(74) *Attorney, Agent, or Firm* — Carlson, Gaskey & Olds, P.C.

(57) ABSTRACT

An exemplary method of facilitating communication includes determining a position of a portable communication device that generates a video output. A sound output control is provided to an audio device that is distinct from the portable communication device for directing a sound output from the audio device based on the determined position of the portable communication device.

20 Claims, 8 Drawing Sheets

FACILITATING COMMUNICATIONS USING A PORTABLE COMMUNICATION DEVICE AND DIRECTED SOUND OUTPUT

FIELD OF THE INVENTION

This invention generally relates to communication. More particularly, this invention relates to sound control for facilitating communications.

DESCRIPTION OF THE RELATED ART

Portable communication devices are in widespread use. Cellular phones, personal digital assistants and notebook computers are extremely popular. As the capabilities and functionalities of these devices increase, the various uses for them increase.

One limitation on portable communication devices is that the loudspeaker of such a device typically does not deliver high quality sound. When such a device is used for observing video, the associated audio typically has poor quality. For example, it would be useful to conduct a video teleconference using a video-capable portable communication device. The sound quality from the loudspeaker of the portable communication device, however, may be poor enough to discourage such use of the device. Similarly, although many portable communication devices have video playback capability, the associated audio output leaves much to be desired.

Attempting to utilize an external audio output with a portable communication device can improve the sound quality. There are significant challenges, however, because of the portability of the communication device. The spatial relationship between an external loudspeaker and the portable communication device can vary during a single use of the device for that purpose. This produces a lack of a cohesive visual and auditory experience. It is very unnatural, for example, for an individual observing a video display of a portable communication device while hearing the associated audio emanating from some arbitrary location in the room in which the individual is situated. Even high quality sound systems will not provide any spatial cohesiveness between the audio output and the video observed on the portable communication device. This lack of cohesiveness leaves much to be desired and would discourage individuals from attempting to utilize their portable communication device in such a manner.

SUMMARY

An exemplary method of facilitating communication includes determining a position of a portable communication device that generates a video output. A sound output control is provided to an audio device that is distinct from the portable communication device for directing a sound output from the audio device based on the determined position of the portable communication device.

An exemplary portable communication device includes a video output. A position sensor provides an indication of a position of the portable communication device. A sound control module is configured to communicate sound control to an audio device that is distinct from the portable communication device. The sound control is based on the position of the portable communication device for facilitating the audio device directing a sound output based on the position of the portable communication device.

The various features and advantages of the disclosed examples will become apparent to those skilled in the art from the following detailed description. The drawings that accompany the detailed description can be briefly described as follows.

DETAILED DESCRIPTION

Figure 1:
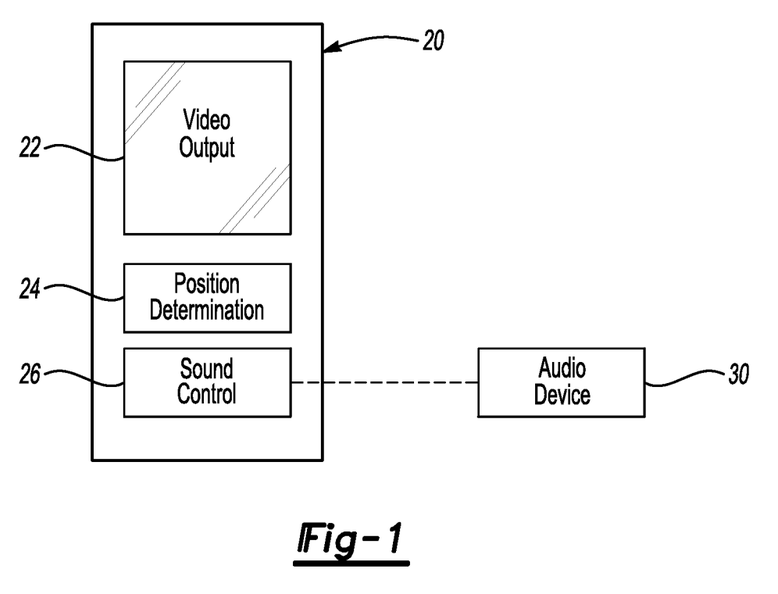
FIG. 1 schematically shows an example portable communication device designed according to an embodiment of this invention.

FIG. 1 schematically shows selected portions of an example portable communication device 20. This example has a video output 22. In this particular example, the video output comprises a display screen that is part of the portable communication device 20. The video output 22 in one example comprises a projector that projects an image onto a selected surface separate from the device 20.

A position determining module 24 provides an indication of a position of the portable communication device 20. The position determining module 24 in this example is capable of providing position information in six dimensions. For example, the position information may include location information in Cartesian coordinates (i.e., x, y, z) and orientation information (i.e., azimuth, elevation and roll). There are known six degree-of-freedom position sensors. One example includes such a known position sensor.

The portable communication device 20 in this example also includes a sound control module 26 such as an audio spatializer. The example portable communication device 20 is capable of being associated with an audio device 30 that is distinct from the portable communication device 20. Example audio devices 30 include headphones or speakers. A hardwired or wireless link allows for the audio device 30 to provide audio output based on information from the sound control module 26. The audio output comprises audio that would otherwise be provided from a loudspeaker of the communication device 20 but, instead, is provided by the distinct audio device 30. The sound control module 26 provides information to the audio device 30 to allow for the desired sound output to be generated by that device.

The sound control module 26 controls sound production based on position information from the position determining module 24. This allows for directing the sound from the audio device 30 so that it has the appearance of emanating from the position of the portable communication device 20. This feature provides spatial cohesiveness between the video output 22 and the sound output from the audio device 30. This allows for high quality sound to be associated with video with spatial cohesiveness that greatly enhances the experience of an individual using the portable communication device 20 to obtain a video output and a distinct audio device 30 to provide high quality sound.

Figure 2:
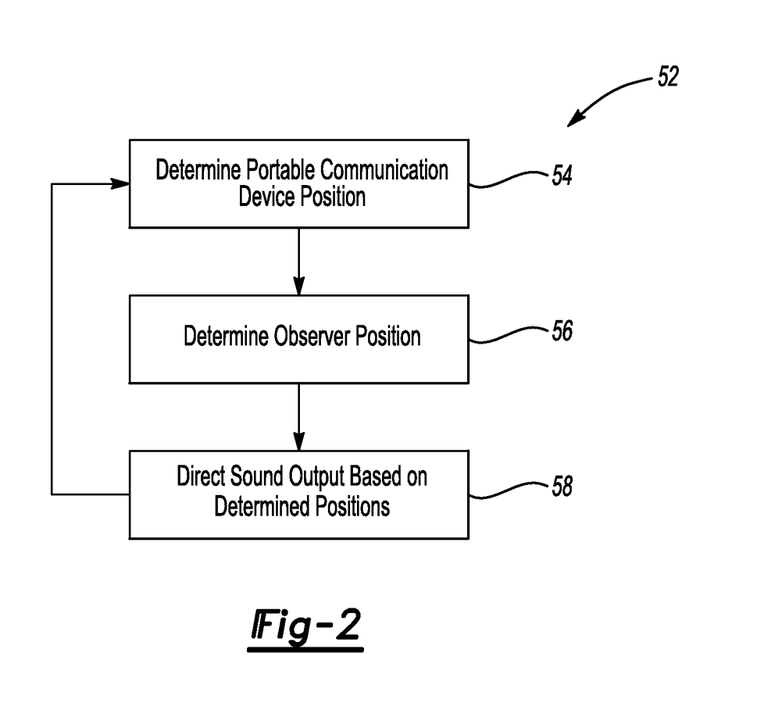
FIG. 2 is a flowchart diagram summarizing an example control approach.

FIG. 2 includes a flowchart diagram 52 that summarizes an example control approach. At 54, the position of the portable communication device is determined. In this example, an observer position is determined at 56. The sound output is then directed based upon the determined positions at 58.

It is possible to utilize the position of a portable communication device relative to a fixed reference point for a given audio device 30. For example, the audio device may include loudspeakers that remain in a fixed position within a particular area and the position of the portable communication device 20 within that area may be determined relative to a selected reference point. It is also possible to determine the observer location of an individual relative to such a fixed reference point. In some examples, the position of the portable communication device or the position of the individual can be used as a reference point so that the determined position of the other is relative to that reference point. In one example, the position of the portable communication device 20 is used as a reference point for purposes of determining the observer position relative to the determined position of the portable communication device 20.

Figure 3:
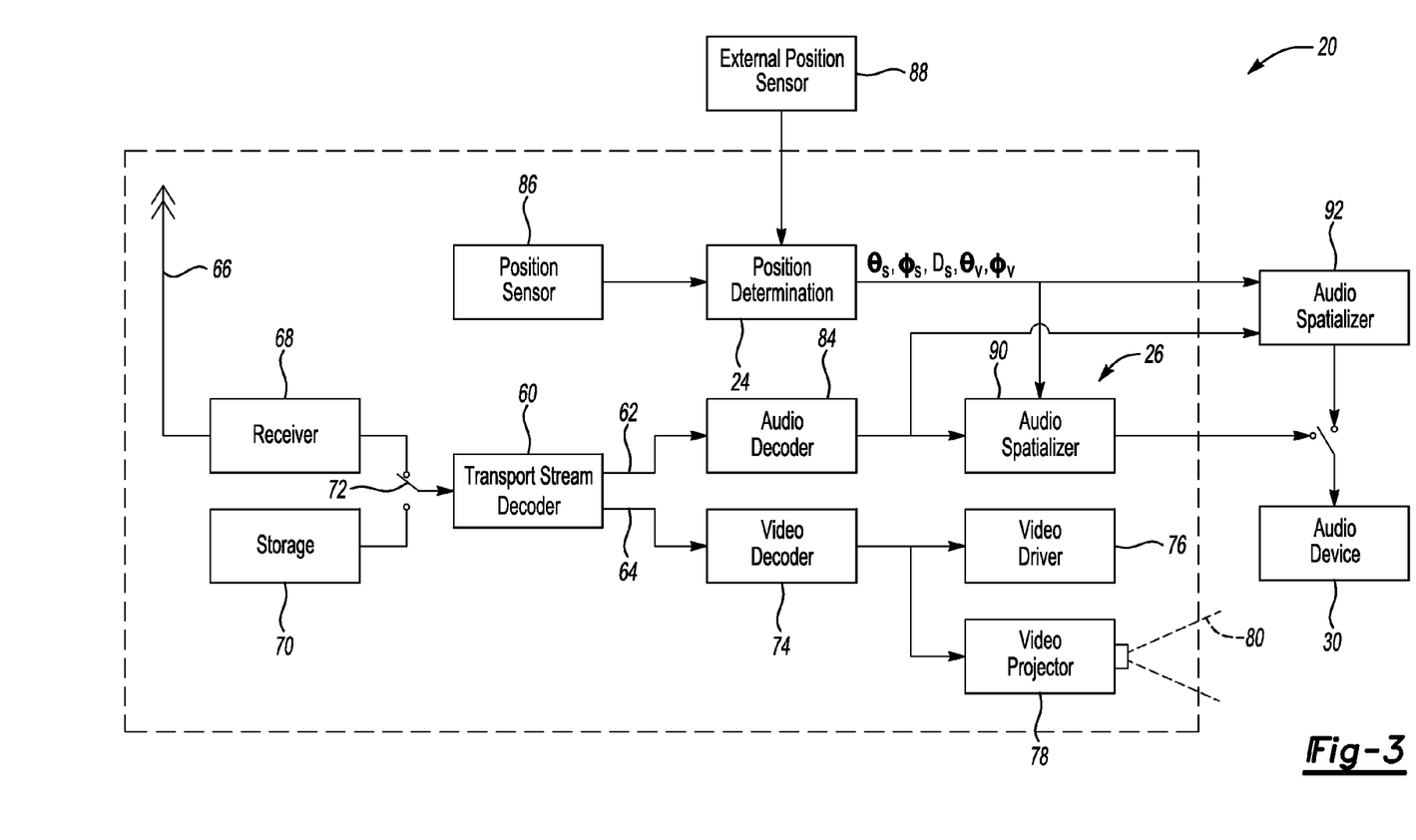
FIG. 3 schematically illustrates portions of the example portable communication device of FIG. 1.

FIG. 3 schematically shows further details of the example portable communication device 20 according to one embodiment. A transport stream decoder 60 splits an audio-visual stream of data into separate audio and video streams. In the illustrated example, the transport stream decoder 60 can receive the audio-visual information based upon a current input to the portable communication device 20. For example, an antenna 66 and a receiver 68 are configured to receive wirelessly communicated audio-video signals that can then be processed by the portable communication device 20. This example also has the ability to play back audio-video information from a storage 70 that may comprise memory that is part of the portable communication device 20 or information stored on external memory that is fed into the portable communication device 20 (e.g., using a disk drive or USB port). The illustrated example includes a switch 72 for selecting the source of audio-video information.

The audio stream is schematically shown at 62. The video stream is schematically shown at 64.

An audio decoder 84 decodes the audio information. Given that the audio output to an individual is intended to be position-oriented, the position determination module 24 obtains position information from a position sensor 86, for example, that provides an indication of a position of the portable communication device 20. The position determination module 24 in this example also receives position information from an external position sensor 88 that is capable of providing an indication of an observer's position (e.g., the location and orientation of headphones worn by an individual). The position determination module 24 makes a determination regarding the position information that is useful for directing the sound output in a manner that provides cohesiveness between the video provided by the portable communication device 20 and the audio output.

In the illustrated example, the portable communication device 20 includes an audio spatializer 90 that provides position-directed audio output information to the audio device 30. Alternatively, the audio information from the audio decoder 84 and the position information from the position determination module 24 are provided to an external audio spatializer 92 that controls the output from the audio device 30 to achieve the spatially-directed sound output from the audio device 30.

The video stream 64 is processed by a video decoder 74. The display of the video information in this example is provided on at least one of an internal video display screen 76 or through a video projector 78 that projects a video beam 80 so that the video may be observed on a nearby surface.

Figure 4:
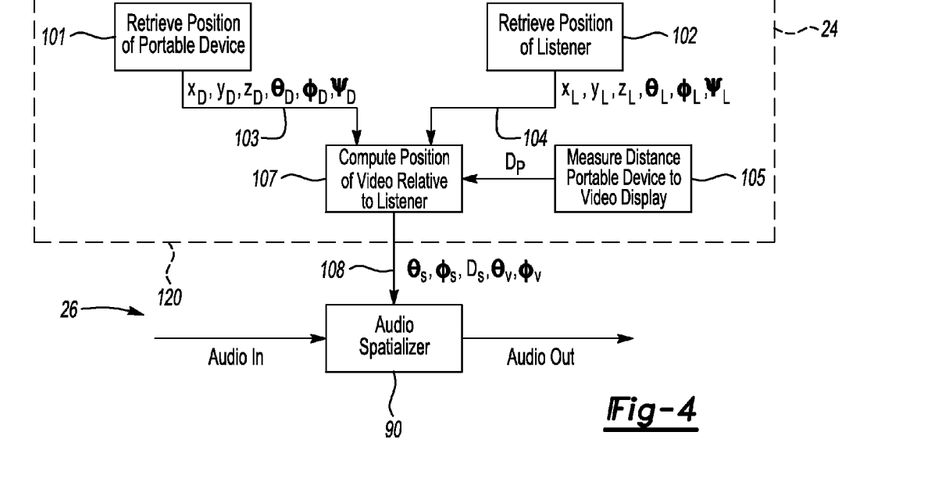
FIG. 4 schematically illustrates an example position determining module.

FIG. 4 schematically shows an example position determination module 24. A device position determining portion 101 provides information regarding the position of the portable communication device 20 as shown at 103. The device position determining portion 101 provides information regarding the position of the portable communication device 20 in terms of Cartesian coordinates ($x_D$, $y_D$, $z_D$) and Euler orientation angles (azimuth $\theta_D$, elevation $\Phi_D$, and roll $\phi_D$) in this example.

An observer position determining portion 102 provides an indication of the position of the observer (e.g., the observer's head). The output 104 from the observer position determining portion 102 is in terms of Cartesian coordinates ($x_L$, $y_L$, $z_L$) and Euler orientation angles (azimuth $\theta_L$, elevation $\phi_L$, and roll $\psi_L$) in this example.

As known, Euler orientation angles are one way of representing the orientation of an object with respect to a reference coordinate system. These angles represent a sequence of rotation of the reference coordinate system, starting with an azimuth rotation, followed by an elevation rotation, followed by a roll rotation. The azimuth angle is defined as a rotation of the X and Y reference axes around the Z axis resulting in rotated axes X' and Y'. The elevation angle can then be defined as a rotation of the Z and X' axes around the Y' axis resulting in rotated axes Z' and X''. Finally, the roll angle is defined as a rotation of the Y' and Z' axes around X'' resulting in rotated axes Y'' and Z''. The new coordinate system X'' Y'' Z'' determines the orientation of the object.

Depending on the video display type (built-in video versus projected video), only a subset of the parameters output by the device position determining portion 101 may be used for further processing. Such a subset can be the Cartesian coordinates ($x_D$, $y_D$, $z_D$) of the portable device, for example. If video is displayed using the projector 78 of portable communication device 20, the Cartesian coordinates ($x_D$, $y_D$, $z_D$) and at least the two orientation parameters azimuth $\theta_D$ and elevation $\phi_D$ are desirable for further processing, since orientation angles $\theta_D$ and $\phi_D$ are generally required for correct determination of the location of the projected video. On the other hand, if video is displayed on the display screen 22, orientation angles may be neglected for the purpose of creating cues for the direction of the sound source. Orientation angles can still be used if it is intended to provide additional cues for the orientation of the sound source. Such cues for the device orientation can be created for example by changing the ratio of direct sound to reverberated sound. When the display 22 of the portable device 20 directly faces the observer, the sound output provides more direct sound than it would if the portable device 20 were turned away from the observer, for example. Additionally or alternatively, a frequency-dependant polar pattern of a human talker can be modeled, whereby in a simple model, the high frequencies are gradually attenuated the more the device is turned away from the observer.

Depending on the acoustic reproduction of sound, only a subset of the parameters 104 from the observer position determining portion 102 may be used for further processing. One example subset comprises the Cartesian coordinates ($x_L$, $y_L$, $z_L$) of the observer.

For sound reproduction when the audio device 30 comprises headphones, at least the Cartesian coordinates ($x_L$, $y_L$, $z_L$) and azimuth $\theta_L$ and elevation $\phi_L$ are desirable from the parameter set 104. The azimuth and elevation indications regarding the observer enable the audio spatializer 90 to compensate for the observer's head orientation. Without such compensation, the sound field will turn with the observer's head due to the sound reproduction over headphones. For example, assume a sound source straight in the front of the observer. If the observer turns his head by 90 degrees counterclockwise, the synthesized sound source direction will continuously be adjusted during this rotation to finally appear from the right side of his head. In this way, regardless of the head rotation, the sound source location will always be fixed in space for the observer. Only if the portable device is moved will the sound source move in space.

For sound reproduction over loudspeakers on the other hand, the orientation angles may be neglected, that is, one may only use the subset ($x_L, y_L, z_L$) of the parameter set 104. In some cases of sound reproduction over loudspeakers, it is still beneficial to use head orientation when spatializing sound. One example includes binaural sound reproduction with cross-talk canceller, which is a well-known technique.

Generally, orientation is specified in three dimensions, azimuth, elevation, and roll. In many practical situations however, azimuth and elevation angles alone determine sound direction to a great extent. For simplicity, roll angles are not further considered in the following discussion. Nevertheless, roll angles of the observer and the device 20 may be applied for further improvement of spatialized audio.

The position determining portions 101 and 102 do not assume any specific reference coordinate system to express the positions of the portable communication device 20 and an observer. In other words, the reference coordinate system can be chosen arbitrarily. In particular, it can be chosen to coincide either with the 6-dimensional position of the moving portable device or with the 6-dimensional position of the moving observer.

If the portable communication device 20 provides a video output through the built-in projector 78, the observable video will be displayed on a wall or projection screen, for example. The example of FIG. 4 includes a distance determining portion 105 that is configured to measures the distance from the portable communication device 20 to the surface upon which the projected video appears. The distance determining portion 105 may be based on a laser or ultrasonic measuring technique to provide an indication of a distance $D_P$. When the video output is provided on the display 22 of the portable communication device 20, the distance determining portion 105 provides an output corresponding to $D_P=0$. For a portable device 20 without an integrated projector 78, the distance determining portion 105 is not needed.

The example of FIG. 4 includes a relative position determining portion 107 that determines the video position and orientation relative to the observer based on the position of the portable communication device 20 and the position of the observer. If the video output is provided by the projector 78, the distance to the wall or projection screen is included. The desired sound source location relative to the observer is determined by three variables, azimuth angle $\theta_S$, elevation angle $\phi_S$, and distance $D_S$. Likewise, the orientation of the sound source or video relative to the observer is determined by azimuth angle $\theta_V$ and elevation angle $\phi_V$. These five parameters are determined by the relative position determining portion 107. In one example, the determination is simplified by not using the device orientation angles. One example does not include the distance $D_S$ as part of the relative position determinations. Given this description, those skilled in the art will realize what information is useful to provide the result that suits the needs of their particular situation.

To derive equations for these five variables, express the position of the observer as a vector, $$p_L = (x_L, y_L, z_L)^T,$$

where superscript T denotes a known transpose operation. Likewise, we express the position of the video display as a vector $$p_V = (x_V, y_V, z_V)^T,$$

and the position of the portable device as a vector $$p_D = (x_D, y_D, z_D)^T.$$

In examples in which the video is displayed on the portable device, itself, $p_V = p_D$. If, on the other hand, the video is displayed from the projector 78 the video position is not known directly from the sensor in the portable device 20. Instead, a determination is needed regarding the video position based on the Cartesian coordinates of the portable device ($p_D$), its orientation ($\theta_D, \phi_D$), and its distance to the wall or projection screen ($D_P$) according to the following equation:

$$p_v = p_D + \rho \cdot D_P, \quad (1)$$

where $\rho$ is the unity vector in the direction from the portable device 20 to the projected video, given by $$\rho = (\cos\theta_D \cos\phi_D \sin\theta_D \cos\phi_D \sin\phi_D)^T$$

The value of Equation (1) may be controlled based on whether the video is displayed on a built-in video display 22 (e.g., $D_P=0$) or the video is displayed by the projector 78 (e.g., $D_P \neq 0$).

The distance of the desired sound source can be calculated using the known norm function $$D_S = \|p_V - p_L\| \quad (2)$$

The desired sound source azimuth angle $\theta_S$ and elevation angle $\phi_S$ are then given by the following equations:

$$\theta_S = \tan^{-1}\{(y_V - y_L)/(x_V - x_L)\} - \theta_L \quad (3)$$

$$\phi_S = \sin^{-1}\{(z_V - z_L)/D_S\} - \phi_L \quad (4)$$

Equations (1)-(4) are used to spatialize sound to match the video location. In particular, the sound source distance $D_S$ in Equation (2) may be used to synthesize potential distance cues. Equations (3) and (4) are used to position the sound source at the correct azimuth and elevation angles. These equations make use of the observer's head position ($x_L, y_L, z_L$) and the observer's head orientation ($\theta_L$ and $\phi_L$). Accounting for head orientation is most relevant when rendering audio output over headphones because it allows for accommodating any rotation or tilting of the observer's head.

Equations (3) and (4) are given for sound rendering over headphones. For rendering over loudspeakers, observer orientation ($\theta_L, \phi_L$) can in general be neglected (e.g., set $\theta_L=0$ and $\phi_L=0$). Although these angles may not be used for the purpose of sound source positioning, they may be used to calculate correct head-related transfer functions (HRTF) in a trans-aural loudspeaker system.

The device orientation can be used to simulate the polar pattern of the sound source. A polar pattern or directivity pattern determines the sound level a sound source emits, specified for a range of 360 degrees. A more general case involves a 3-D polar pattern that specifies the sound level emitted over a spherical range. As such, a 3-D polar pattern can be determined for example for a human talker or a musical instrument. Polar patterns are commonly frequency dependant, that is, they are specified at different frequencies.

To relate the orientation of the mobile device to a desired polar pattern, one example includes determining the relative orientation of the device with respect to the observer position. For this purpose, we express the vector from observer to mobile device, $$p_O = p_V - p_L,$$

in terms of the coordinate system of the portable communication device 20 using a well known coordinate transformation. The vector from the observer to the device 20 in the device's coordinate system becomes $$p_O' = R p_O,$$

where $$R = \begin{bmatrix} \cos\theta_D\cos\psi_D - \cos\varphi_D\sin\theta_D\sin\psi_D & \sin\theta_D\cos\psi_D + \cos\theta_D\cos\varphi_D\sin\psi_D & \sin\varphi_D\sin\psi_D \\ -\cos\varphi_D\cos\psi_D\sin\theta_D - \cos\theta_D\sin\psi_D & \cos\theta_D\cos\varphi_D\sin\psi_D - \sin\theta_D\sin\psi_D & \sin\varphi_D\cos\psi_D \\ \sin\theta_D\sin\varphi_D & -\cos\theta_D\sin\varphi_D & \cos\varphi_D \end{bmatrix}$$

Vector $p_O'$ relates directly to the polar pattern. Azimuth and elevation angles of the transformed vector $$p_O' = (x_O' y_O' z_O')^T$$

are determined by $$\theta_V = \tan^{-1}\{(y_O')/(x_O')\} \qquad (5)$$

$$\phi_V = \tan^{-1}\{(z_O')/\sqrt{(x_O')^2 + (y_O')^2}\} \qquad (6)$$

Given a desired polar pattern, one example includes evaluating this polar pattern at azimuth angle $\theta_V$ and elevation angle $\phi_V$. This evaluation is done along the frequency axis to obtain a frequency response for each pair of azimuth and elevation angles.

Once the relative position of video is determined by the relative position determining portion 107 as exemplified by Equations (2)-(6), the resulting parameters are provided to the spatializer 90.

The audio spatializer 90 receives the audio information from the audio decoder 84 and produces spatial audio that matches video location so that the output of the audio device 30 (e.g., headphones or loudspeakers) is based on the positional information from the position determination module 24.

Figure 5:
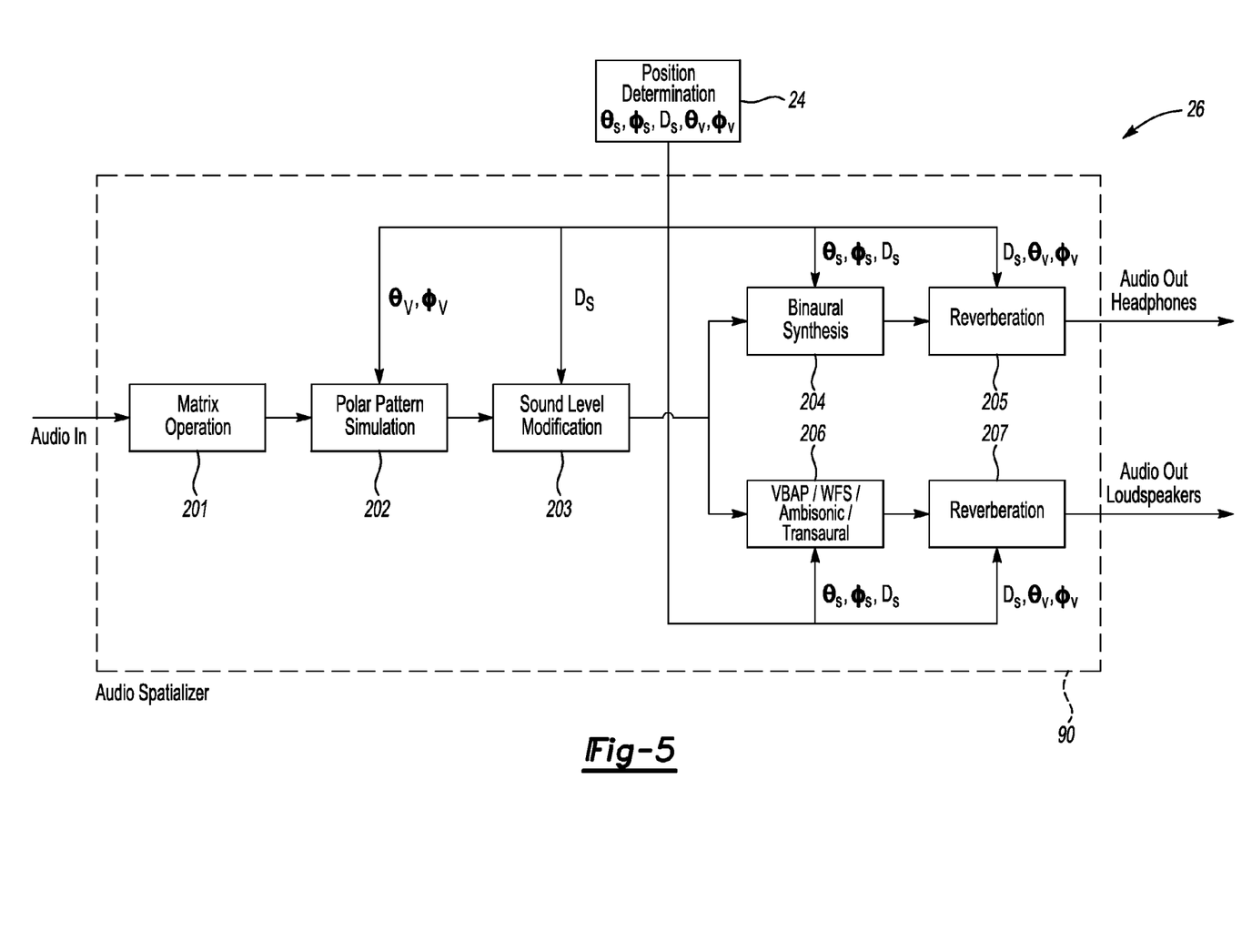
FIG. 5 schematically illustrates an example sound control module.

FIG. 5 shows an exemplary embodiment of the audio spatializer 90. This example accommodates different input formats and includes a matrix operation portion 201. The input format is either downward converted to mono or may be retained in the case of an Ambisonic input format. Input format examples are mono (1 channel), stereo (2 channels), multichannel stereo such as 3/2 (3 front channels/2 surround channels), or Ambisonic B-format (four channels). Mono can be directly spatialized especially when near-field recordings are used in which a microphone is close to the original sound source such that the recording contains mostly direct sound, with little room reverberation. Stereo can be converted to mono as well, in particular if the recording originates from a coincident stereo microphone. Likewise, 3/2 multichannel stereo can be converted to mono.

For the case where audio input is mixed down to a monaural signal, the matrix operation portion 201 reduces to a vector operation. For the trivial case of monaural input, the matrix operation 201 is represented by $$y_{1/0} = M_{1/0} x_{1/0},$$

where $x_{1/0} = x$ denotes the scalar input sample, and $y_{1/0}$ denotes the output sample. For the trivial case of monaural input, the matrix reduces to a scalar, that is, $M_{1/0} = 1$.

For 2-channel stereo input, the matrix operation 201 is represented by $$y_{1/0} = M_{2/0} x_{2/0},$$

where $x_{2/0} = [x_L \ x_R]^T$ denotes the 2-dimensional input vector for left and right channel sample, $y_{1/0}$ denotes the monaural output sample, and $M_{2/0} = [0.5 \ 0.5]$.

For 5-channel stereo input, the matrix operation 201 is represented by $$y_{1/0} = M_{3/2} x_{3/2}$$

where $x_{3/2} = [x_L \ x_R \ x_C \ x_{LS} \ x_{RS}]^T$ denotes the 5-dimensional input vector for left, right, center, left surround, and right surround channel and $y_{1/0}$ denotes the monaural output sample. For example, $M_{3/2} = [0.7071 \ 0.7071 \ 1.000 \ 0.500 \ 0.500]$ according to ITU-R BS.775-2 recommendation, or alternatively $\tilde{M}_{3/2} = [0.333 \ 0.333 \ 0.333 \ 0 \ 0]$ to reduce the amount of reverberant sound.

When audio input is in Ambisonic format, subsequent processing may use this format directly, since the Ambisonic format allows sound field rotation. For example, an Ambisonic B-format signal set consists of four channels, commonly denoted as W,X,Y,Z signals. Subsequent Ambisonic processing in the matrix operation portion 201 includes simply passing the signals through $$y_A = M_A x_A$$

with $x_A = [x_W \ x_X \ x_Y \ x_Z]^T$ being the input vector, and $M_A$ the identity matrix of size four. Alternatively, one may for example choose the omni-directional channel W of the Ambisonic format to further proceed with a monaural signal.

A polar pattern simulator 202 simulates the polar pattern or directivity of the created sound source. The polar pattern indicates the sound level at which sound is emitted from the audio device 30 for different horizontal and vertical angles. It is typically specified at various frequencies. Consider the polar pattern of a human talker. As an individual's face turns 180 degrees from front to back, the sound level reduces for the observer. This is particularly true at high frequencies. The polar pattern simulator 202 in one example stores polar patterns as look up tables or computes models for the polar pattern based on azimuth and elevation angles. Equivalent to a frequency-dependant polar pattern, a frequency response can be specified at different azimuth/elevation angle combinations. That is, a filter response for the polar pattern can be specified as a function of frequency and angles $\theta_V, \phi_V$. To give a simple example, consider only the horizontal orientation angle $\theta_V$, which is defined as the angle between the two vectors that are defined by the orientation of the device and the vector device to observer. One example uses a simple low-pass filter characteristic that is dependant on the orientation of the device and defined in the z-domain as $$H_{PP}(z) = \frac{1 + a \cdot z^{-1}}{1 + a},$$

where $$a = |\sin(\theta_V/2)|$$

If the device is facing the observer ($\theta_V=0$), a flat frequency response results, since $H_{PP}(z)|_{\theta_V=0}=1$. The more the device turns away from the observer, the more the higher frequencies are reduced.

The output of the polar pattern simulator 202 is processed by a sound level modification portion 203. The sound level is changed based on the distance $D_S$. For example, the inverse square law that applies to an acoustic point source can be used, expressed with the following input-output equation:

$$y = \left(\frac{D_{REF}}{D_S}\right)^2 \cdot x,$$

where x denotes the input, y the output, and $D_{REF}$ the reference distance, e.g. $D_{REF}=1$ meter. For this particular sound level modification portion 203, the sound power level drops 6 dB if the observer's distance to the portable communication device 20 doubles.

The illustrated example includes a binaural synthesizer 204 for headphone output. The binaural synthesizer 204 can be considered the core element for sound spatialization. It generates binaural audio (i.e., left and right signals dedicated for reproduction on headphones). The binaural synthesizer 204 uses head-related transfer functions (HRTF) expressed in the frequency domain or equivalent head-related impulse responses (HRIR) expressed in the time domain. An exemplary realization of the binaural synthesizer 204 uses finite impulse response filters to generate left and right signals $y_L(i)$, $y_R(i)$ from an input signal $x(i)$. Such a filter operation can be expressed as $$y_L(i) = \sum_{j=0}^{M-1} h_{L,j}(\theta_S, \varphi_S, D_S) \cdot x(i-j),$$

$$y_L(i) = \sum_{j=0}^{M-1} h_{R,j}(\theta_S, \varphi_S, D_S) \cdot x(i-j),$$

where i denotes the time index, $h_{L,j}(\theta_S, \phi_S, D_S)$ and $h_{R,j}(\theta_S, \phi_S, D_S)$ denote the head-related impulse responses for the left and right ears, respectively, and M denotes the order of the head-related impulse response.

The above equations are used when the input x(i) is a monaural signal. For the case of an Ambisonic signal set, a corresponding set of virtual loudspeaker signals is created and then convolved with the HRIRs to produce the binaural output signals using a known technique in one example.

A reverberation portion 205 adds reverberation to the binaural signals in this example. Reverberation algorithms are known in the art and a known algorithm is used in one example. The degree of reverberation may depend on the distance $D_S$. In one example a larger value for $D_S$ corresponds to more reverberation. Likewise, reverberation may depend on the orientation of the portable communication device 20. If, for example, the device 20 is turned away from the observer, more reverberation may be added, since sound will arrive at the observer's location mostly via reflection rather than via direct path.

The example of FIG. 5 is also capable of providing sound output over loudspeakers. A sound synthesizer 206 constitutes the core element for sound spatialization when the audio device is not headphones. A number of techniques are well-known for providing spatially oriented sound output from loudspeakers, such as Vector Base Amplitude Panning (VBAP), Ambsionic, Wave Field Synthesis (WFS), and transaural sound reproduction. A reverberation portion 207 is similar in operation to the reverberation portion 205 so that the audio device 30 provides an appropriate amount of reverberation to enhance the spatial quality of the sound output.

The schematically illustrated modules and portions may comprise hardware (e.g., dedicated circuitry), software, firmware or a combination of two or more of these. Those skilled in the art who have the benefit of this description will realize which combination of these will provide the results required for their particular situation. Additionally, the individual modules and portions are divided for discussion purposes and the functions of each may be accomplished using the hardware, software or firmware that accomplishes a function schematically dedicated to another one of the illustrated portions or modules.

Figure 6:
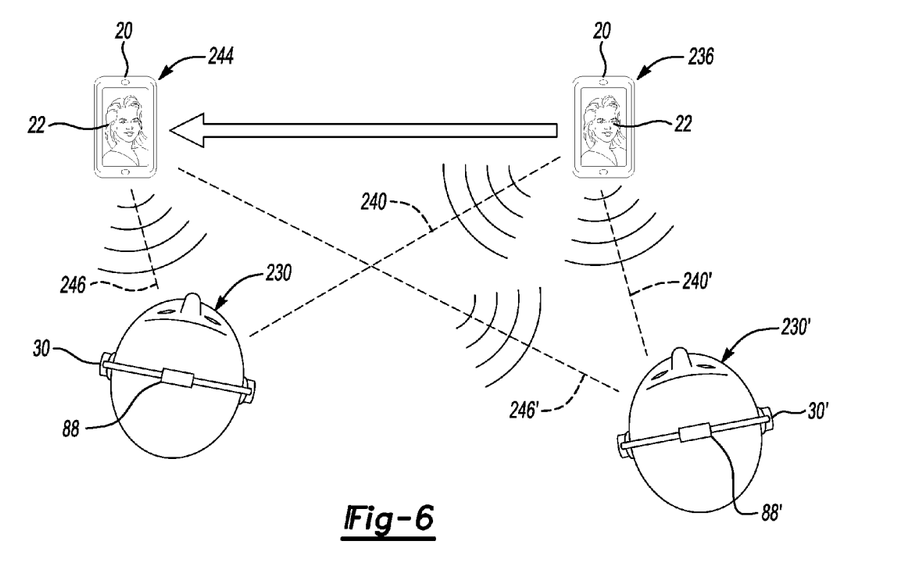
FIG. 6 diagrammatically illustrates one example use of a portable communication device with a distinct audio device.

FIG. 6 schematically illustrates an implementation in which an individual 230 utilizes headphones as the audio device 30. Headphones present a unique challenge in that the position (e.g., location, orientation or both) of the individual's head may change relative to the position of the portable communication device 20. In most situations, the position of the individual's head will change more frequently than the position of the portable communication device 20.

The example of FIG. 6 includes an observer tracker or position and orientation sensor 88 for determining the position and orientation of the headphones 30 or the individual's head relevant to a reference point such as the determined position of the portable communication device 20. In one example, the position and orientation sensor 88 comprises a six degree of freedom head tracker that provides an indication of a current location and orientation of the individual's head. One such position and orientation sensor 88 provides position information that allows for determining lateral (i.e., right-to-left), frontal (forward-backward), and vertical (i.e., up-down) head position information, as well as orientation angles (azimuth, elevation, roll).

The information from the position and orientation sensor 88 is provided to the position determination module 24 where it is used as described above.

The sound output from the headphones is adjusted to give the appearance that it is directed from the current position of the portable communication device 20. There are known techniques for adjusting the frequency and amplitude of the output from each of the individual speakers of the headphones to achieve a directional effect. One example includes the binaural sound reproduction techniques mentioned above to enhance the directional effect of the sound output.

Another feature of the example of FIG. 6 is that there is another individual 230' using a separate set of headphones as the distinct audio device 30'. A separate head tracker 88' is associated with the headphones 30' for the individual 230'. This allows for separately determining the location of the two individuals and separately controlling the sound output of the two sets of headphones so that each individual has an audio experience that provides spatial cohesiveness with the current position of the portable communication device 20. As schematically shown in FIG. 6, the individual 230 is positioned relative to a first location 236 of the portable communication device 20 in a manner that results in a sound direction schematically shown at 240. The individual 230' is in a different location which results in a different sound direction 240' while the portable communication device 20 is in the location 236.

As the portable communication device 20 moves to the position 244, the sound direction is continuously updated in one example. Those skilled in the art will realize that "continuously updated" as used in the context of this description will be dependent on the limitations of the programming or processors in the devices being used. When in the position 244, the sound direction 246 is used to control the sound output of the headphones 30 worn by the individual 230 and the sound output provided by the headphones 30' worn by the individual 230' is directed as schematically shown at 246'. This example demonstrates how a plurality of individuals each having their own audio device 30 can receive a sound output that has spatial cohesiveness with the position of the portable communication device 20.

Figure 7:
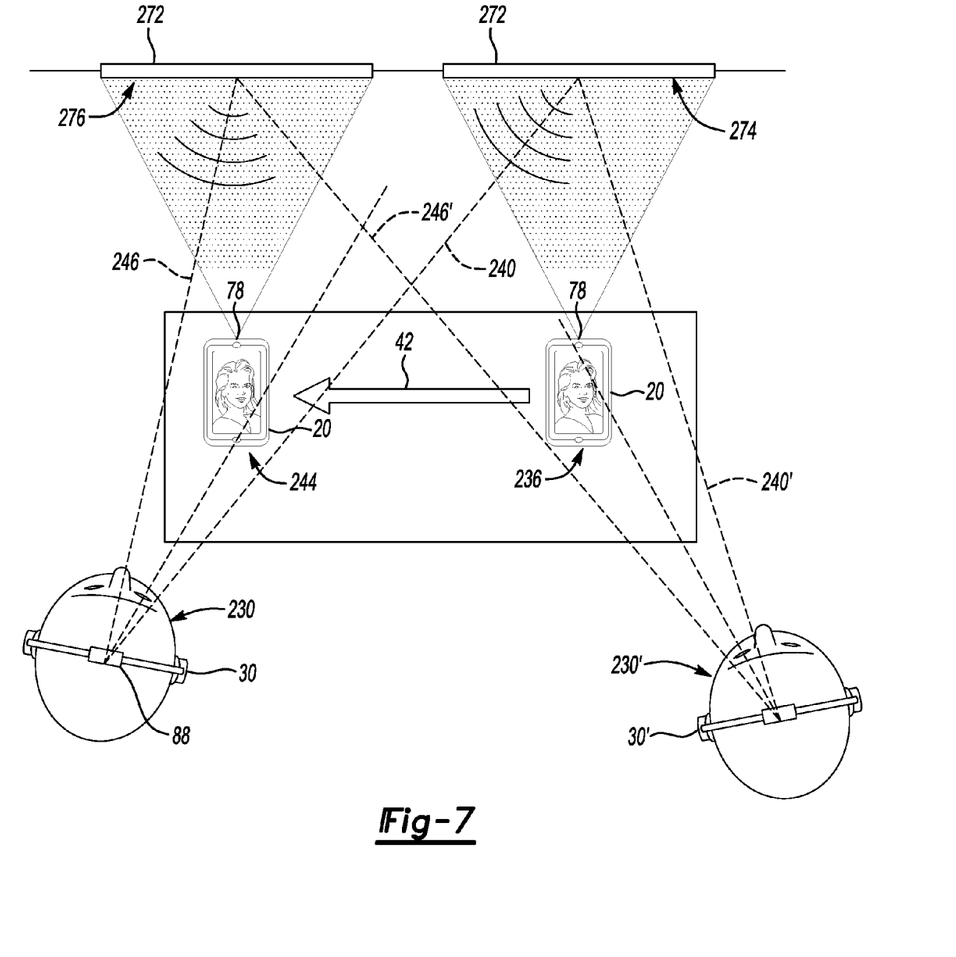
FIG. 7 schematically illustrates another example use of a portable communication device and a distinct audio device.

FIG. 7 schematically shows another example implementation in which the portable communication device 20 includes a projector 78 that projects an image 272 onto a surface that is spaced from the current position of the portable communication device 20. In this example, when the portable communication device 20 is in the position 236, a resulting image location is schematically shown at 274. When the portable communication device 20 moves to the position 244, the resulting image location is schematically shown at 276. In this example, the sound directions 240, 246, 240' and 246' are controlled based upon the image locations 274 and 276 and the position and orientation of the observer's head. The sound control module 26 in this example is configured to use the determination made by the position determining module 24 regarding the location of the projected image based upon the determined location of the portable communication device 20 and the distance to the image location. For example, a known distance sensor can be associated with the projector 78 to determine an approximate distance from the projector to a wall surface that is facing the portable communication device 20 in the direction of projection of the projector 78. The spatially oriented sound information (determined as described above) is used to control the output of the audio devices 30 and 30', which in this case comprise headphones, so that an appropriate sound direction for the sound output for each individual observer is achieved.

Figure 8:
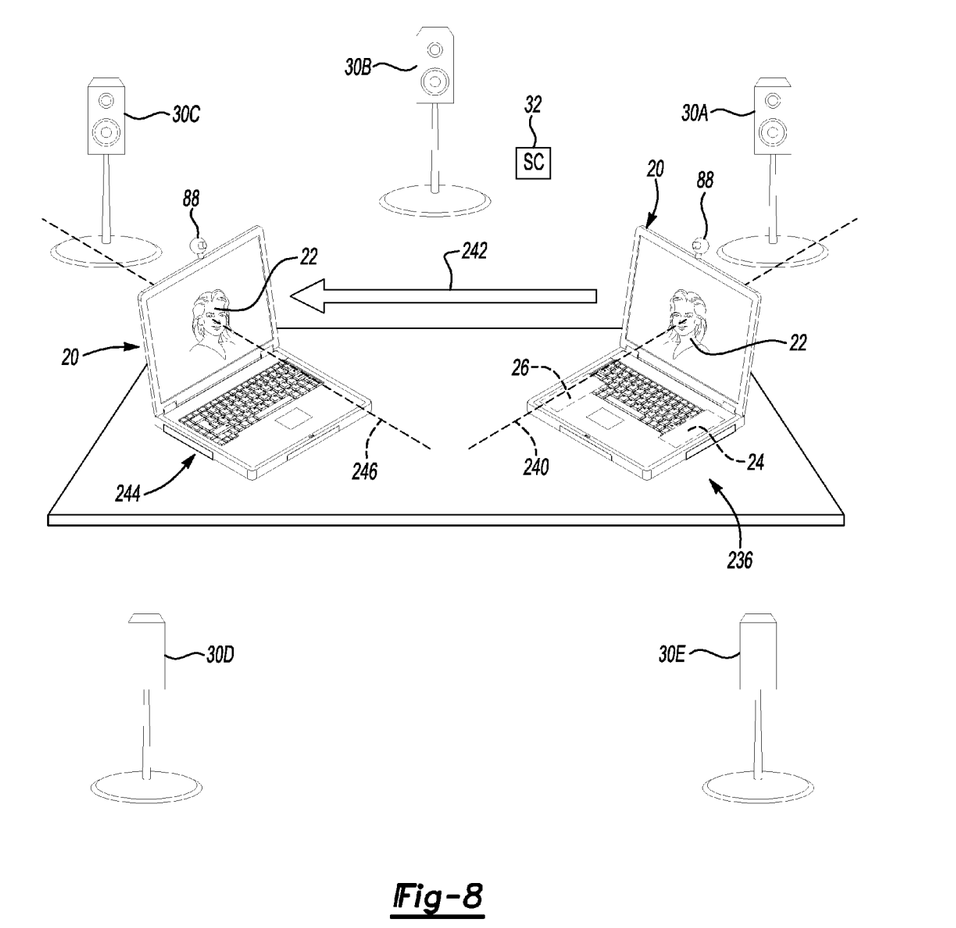
FIG. 8 schematically illustrates another example use of a portable communication device with a distinct audio device.

FIG. 8 illustrates one example use of the portable communication device 20. In this example, the portable communication device 20 comprises a notebook computer. The audio device 30 in this example comprises a loudspeaker system within an individual's home, for example. Multiple speakers 30a, 30b, 30c, 30d and 30e are used in this example to provide high quality sound output. The sound control module 26 communicates with a speaker control driver 32. The sound control module 26 provides information to the speaker control driver 32 so that the appropriate sound is generated and so that the sound output is directed from the speakers based upon the position of the portable communication device 20.

Assume, for example, that the portable communication device 20 is in a first position shown at 236 relative to the speakers 30a-30e. The position determining module 24 determines the location and orientation of the portable communication device 20 and the sound control module 26 communicates that information to the speaker control driver 32. The resulting sound from the speakers has a sound direction shown schematically at 240. The manner in which the speakers are controlled causes a sound output that appears to be directed along the sound direction 240 so that the audio or sound output from the speakers 30a-30e and the video of the video output 22 come from approximately the same location as perceived by an observer.

There are known techniques for controlling speakers to achieve a desired sound direction of the sound output from the speakers. Such known techniques are used in one example implementation.

Assume now that an individual moves the portable communication device 20 from the position at 236 as schematically shown by the arrow 242. The portable communication device 20 eventually reaches another position 244. As can be appreciated from FIG. 8, the location and orientation of the portable communication device 20 has changed as a result of the movement schematically shown by the arrow 242. The sound control module 26 provides new information to the speaker control driver 32 so that the sound direction of the sound output from the speakers 30a-30e changes accordingly. The new sound direction schematically shown at 246 corresponds to the illustrated position 244 of the portable communication device 20.

As can be appreciated from the example of FIG. 2, providing position information to the speaker control driver 32 allows for the distinct audio device (e.g., speakers 30a-30e) to direct the sound output so that it is based upon the position information regarding the portable communication device 20. An observer of the video and sound output has the experience that both come from at least approximately the same location.

The control over the sound direction is continuously updated in one example so that the sound direction moves as the portable communication device 20 moves.

The example of FIG. 8 includes a camera as the exterior sensor 88 associated with the portable communication device 20. The camera 88 is used for observing the location of an individual observing the video output and the sound output. In one example, the sound control module 26 receives information indicating a current position of an individual within the field of view of the camera 88 and uses that information to provide an indication of an observer position relative to the position of the portable communication device 20 for corresponding speaker control. The information regarding the position of the individual observer and the information regarding the position of the portable communication device 20 are used in such an example for directing the sound from the speakers 30a-30b. In the example of FIG. 8, the sound directions 240 and 246 are based on an individual observer remaining in a single location that corresponds to the approximate intersection point of the schematic lines 240 and 246 in the drawing.

Figure 9:
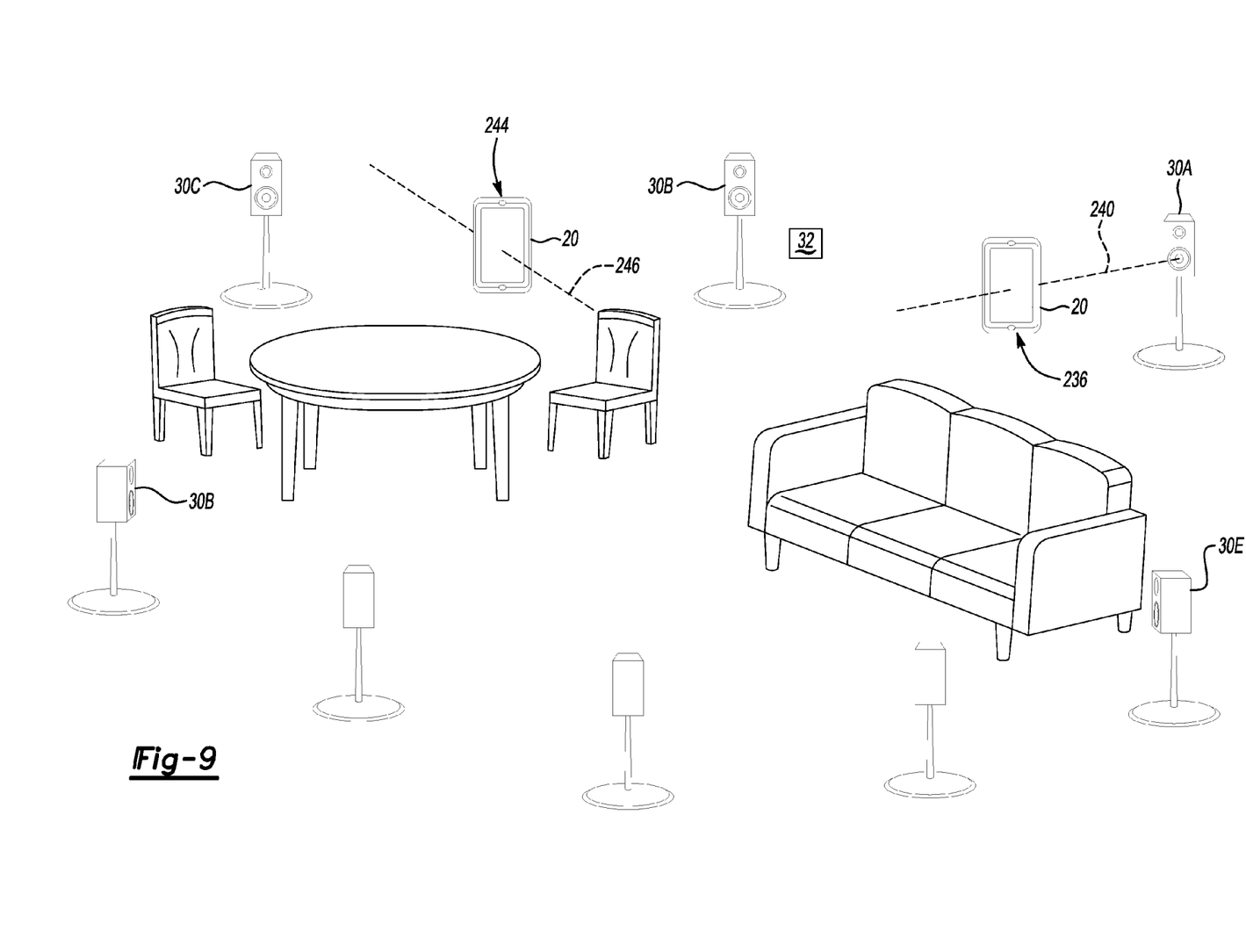
FIG. 9 schematically illustrates another example use of a portable communication device with a distinct audio device.

FIG. 9 shows another example use of a portable communication device 20 with a distinct audio device 30. In this example, a cellular phone is used by an individual for conducting a teleconference, for example. To achieve better audio output than is available on the loudspeaker of the cellular phone 20, a wireless link is established between the cellular phone 20 and a speaker control driver 32 associated with a plurality of speakers 30a-30e, which provide the sound output. In this example, an individual (not illustrated) and the portable communication device 20 are situated in the first location 236. Based on the determined position of the portable communication device 20, the first sound direction 240 is utilized for directing the sound output from the speakers 30a-30e. That way, the sound output appears to come from the approximate location of the portable communication device 20.

In the example of FIG. 9, at some point during the teleconference, the individual carries the portable communication device 20 into another area so that the portable communication device 20 is in a second location 244. Based on the updated location information, the direction of the sound output is shown schematically at 246.

In this example, as the portable communication device 20 is carried from the position at 36 to the position at 44, the position information is continuously updated and provided to the speaker control driver 32 so that the sound direction is continuously updated and continuously appears to emanate from the approximate location of the portable communication device 20. The sound control module 26 provides updated information to the speaker control driver 32 in one example on a continuous basis. In one example, whenever the position determining module 24 detects some change in position (i.e., location or orientation) of the portable communication device 20, the sound control module 26 provides updated information to the speaker control driver 32 so that any necessary adjustment to the direction of the sound output may be made.

Figure 10:
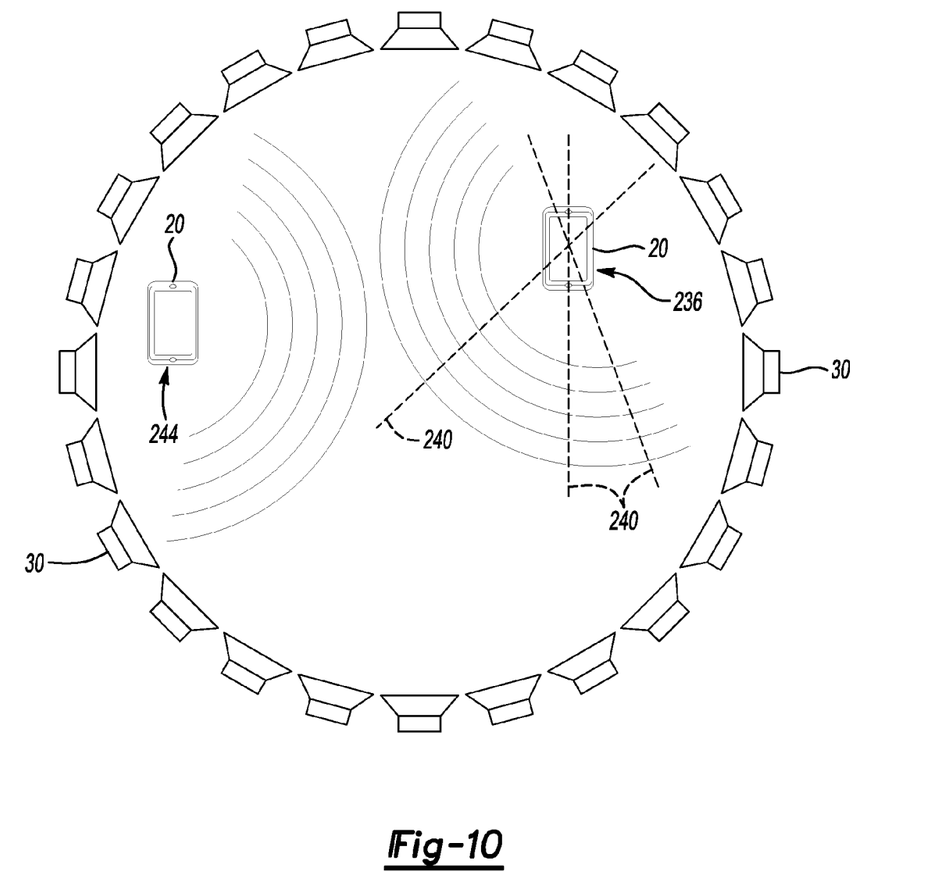
FIG. 10 schematically illustrates another example use of a portable communication device with a distinct audio device.

FIG. 10 schematically shows another arrangement in which sound is provided from a circular wave field system based on the determined position of the portable communication device 20. Circular wave field systems are known and they use a circular wave field synthesis or ambisonic technique for focusing the sound source from a particular location. In this example, the determined position information regarding the portable communication device 20 provides the location from which the sound is focused. Accordingly, the sound direction is focused at the determined position of the portable communication device 20 as schematically shown by the sound direction lines 240 when the portable communication device 20 is in the position 236. As the device is moved to another position 244, the location of the sound output focus changes accordingly.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of facilitating communication, comprising the steps of:
   determining a position of a portable communication device that generates a video output; and
   providing sound output control for an audio device that is distinct from the portable communication device for directing a sound output based on the determined position of the communication device, wherein the sound output control is configured to facilitate the sound output appearing to come from the video output.

2. The method of claim 1, comprising
   updating the determined position of the portable communication device responsive to a movement of the portable communication device.

3. The method of claim 1, comprising determining the position of the portable communication device in six dimensions.

4. The method of claim 1, wherein the portable communication device provides a projected video output at an image location that is distinct from the position of the portable communication device and the method comprises
   determining an image location based on the determined position of the portable communication device; and
   providing the sound output control based on the determined image location for facilitating the sound output appearing to come from the image location.

5. The method of claim 1, wherein the audio device is moveable during the sound output and the method comprises
   determining a position of the audio device relative to the position of the portable communication device; and
   providing the sound output control based on the determined position of the audio device.

6. The method of claim 1, wherein the audio device comprises a plurality of speakers that remain in a fixed position during the sound output.

7. The method of claim 1, comprising
   providing a binaural sound output that appears to a listener to be coming from the determined position of the portable communication device.

8. A method of facilitating communication, comprising the steps of:
   determining a position of a portable communication device that generates a video output;
   providing sound output control for an audio device that is distinct from the portable communication device for directing a sound output based on the determined position of the communication device;
   determining an observer position of an individual listening to the sound output and watching the video output; and
   providing the sound output control based on the determined observer position to facilitate the sound output appearing to come from the position of the portable communication device toward the observer position.

9. The method of claim 8, comprising
   determining the observer position relative to the determined position of the portable communication device.

10. The method of claim 8, comprising
    determining a head position of the individual including a vertical orientation and a horizontal orientation of a head of the individual; and
    providing the sound output control based on the head position.

11. The method of claim 10, wherein the audio device comprises headphones with an associated head tracker device.

12. The method of claim 8, comprising
    using a camera to determine the observer position.

13. The method of claim 8, comprising
    updating the determined observer position responsive to a movement of the individual.

14. The method of claim 8, comprising
    determining the observer position in six dimensions.

15. The method of claim 8, wherein there are a plurality of individuals listening to the sound output and watching the video output, each of the plurality of individuals has an associated audio device and the method comprises:
    determining the observer position of each of the plurality of individuals, respectively; and
    providing the sound output control for each of the audio devices for each of the corresponding individuals based on the determined position of the portable communication device and the respective determined observer positions.

16. A portable communication device, comprising:
    a video output;
    a position determining module that provides an indication of a position of the portable communication device; and
    a sound control module that is configured to communicate sound control to an audio device that is distinct from the portable communication device, the sound control being based on the position of the portable communication device for facilitating the audio device directing a sound output based on the position of the portable communication device, wherein the sound output control is configured to facilitate the sound output appearing to come from the video output.

17. The portable communication device of claim 16, wherein the position determining module provides an update of the indication of the position of the portable communication device responsive to a movement of the portable communication device.

18. The portable communication device of claim 16, wherein the video output projects an image at an image location separate from the position of the portable communication device and the position determining module provides an indication of the image location.

19. The portable communication device of claim 16, comprising
an observer tracker that determines an observer position of an individual watching the video output and listening to the sound output, the observer tracker communicating with the position determining module and the sound control module for including the observer position for facilitating the sound output appearing to come from the position of the portable communication device toward the observer position.

20. A method of modifying an audio signal based on a relative orientation of a device with respect to a listener, the method comprising the steps of:
simulating a polar pattern of the device;
determining an orientation of the device relative to the listener;
determining a frequency response of the polar pattern based on the determined orientation of the device relative to the listener; and
filtering the audio signal based on the determined frequency response.

* * * * *